US012767084B2

(12) United States Patent
Lee et al.

(10) Patent No.: US 12,767,084 B2
(45) Date of Patent: Oct. 20, 2026

(54) AIRBAG DEVICE AND METHOD OF FABRICATING SAME

(71) Applicant: HYUNDAI MOBIS CO., LTD., Seoul (KR)

(72) Inventors: Seok Min Lee, Yongin-si (KR); Dong Joon Lee, Yongin-si (KR); Dong Young Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/221,119

(22) Filed: May 28, 2025

(65) Prior Publication Data

US 2025/0368157 A1 Dec. 4, 2025

(30) Foreign Application Priority Data

May 28, 2024 (KR) ........................ 10-2024-0069433
Jun. 19, 2024 (KR) ........................ 10-2024-0079713

(51) Int. Cl.
*B60R 21/233* (2006.01)
*B60R 21/205* (2011.01)
(Continued)

(52) U.S. Cl.
CPC .......... *B60R 21/233* (2013.01); *B60R 21/205* (2013.01); *B60R 21/217* (2013.01); *B60R 21/2338* (2013.01); *B60R 21/237* (2013.01); *B60R 21/239* (2013.01); *B60R 2021/23308* (2013.01); *B60R 2021/23316* (2013.01); *B60R 2021/23324* (2013.01);
(Continued)

(58) Field of Classification Search
CPC . B60R 21/233; B60R 21/205; B60R 21/2338; B60R 21/239; B60R 21/231; B60R 21/206; B60R 2021/23382; B60R 2021/23308; B60R 2021/23324; B60R 2021/2395; B60R 2021/26094; B60R 2021/23316
USPC .... 280/729, 728.2, 732, 743.1, 743.2, 730.1
See application file for complete search history.

(56) References Cited

U.S. PATENT DOCUMENTS 9,650,011 B1 * 5/2017 Belwafa ................ B60R 21/233
10,611,331 B2 * 4/2020 Jang .................... B60R 21/2338
(Continued)

FOREIGN PATENT DOCUMENTS

DE 102008028389 A1 * 12/2009 ........... B60R 21/233
EP 3 428 018 A1 1/2019
(Continued)

OTHER PUBLICATIONS

Extended European Search Report Issued on Oct. 21, 2025, in Counterpart European Patent Application No. 25178915.2 (12 Pages in English).

*Primary Examiner* — Keith J Frisby
(74) *Attorney, Agent, or Firm* — NSIP Law

(57) ABSTRACT

An airbag device and a method therefor are provided. The airbag device includes a cushion mounted on an instrument panel and configured to inflate by injection of gas from an inflator and deploy upwardly between the instrument panel and an occupant, a partition provided in the cushion and configured to compartmentalize an interior of the cushion, the partition including a first opening through which gas flows upon deployment of the inflator, and a vent provided in the partition and in communication with the first opening to guide flow of gas.

8 Claims, 13 Drawing Sheets

(51) Int. Cl.

| | |
|---|---|
| ***B60R 21/217*** | (2011.01) |
| ***B60R 21/2338*** | (2011.01) |
| ***B60R 21/237*** | (2006.01) |
| ***B60R 21/239*** | (2006.01) |
| *B60R 21/26* | (2011.01) |

(52) U.S. Cl.

CPC ............... *B60R 2021/23382* (2013.01); *B60R 2021/23386* (2013.01); *B60R 2021/2395* (2013.01); *B60R 2021/26094* (2013.01)

(56) References Cited

U.S. PATENT DOCUMENTS

| | | | | |
|---|---|---|---|---|
| 11,752,970 | B1 * | 9/2023 | Lin | B60R 21/2338 280/729 |
| 2003/0034638 | A1 * | 2/2003 | Yoshida | B60R 21/233 280/729 |
| 2008/0143086 | A1 * | 6/2008 | Higuchi | B60R 21/2346 280/736 |
| 2011/0018240 | A1 * | 1/2011 | Marable | B60R 21/239 280/729 |
| 2015/0001835 | A1 * | 1/2015 | Fukurono | B60R 21/239 280/729 |
| 2017/0369025 | A1 * | 12/2017 | Jang | B60R 21/233 |
| 2019/0039557 | A1 | 2/2019 | Barnes et al. | |
| 2021/0046893 | A1 * | 2/2021 | Rosenberg | B60R 21/013 |

FOREIGN PATENT DOCUMENTS

| | | | | | |
|---|---|---|---|---|---|
| JP | 2001-63508 | A | | 3/2001 | |
| JP | 2006076418 | A | * | 3/2006 | |
| JP | 2008149965 | A | * | 7/2008 | |
| JP | 2009190573 | A | * | 8/2009 | |
| JP | 2011143856 | A | * | 7/2011 | |
| JP | 2018158728 | A | * | 10/2018 | |
| JP | 2020093756 | A | * | 6/2020 | |
| KR | 20090089984 | A | * | 8/2009 | B60R 21/276 |
| KR | 20170009576 | A | * | 1/2017 | B60R 21/206 |
| KR | 10-2027918 | B1 | | 10/2019 | |
| WO | WO 2014/054478 | A1 | | 4/2014 | |

* cited by examiner

AIRBAG DEVICE AND METHOD OF FABRICATING SAME

CROSS-REFERENCE TO RELATED APPLICATIONS

This application claims priority to and the benefit under 35 USC § 119(a) of Korean Patent Application Nos. 10-2024-0069433 and 10-2024-0079713, filed on May 28, 2024, and Jun. 19, 2024, respectively, which are hereby incorporated by reference for all purposes.

BACKGROUND

1. Field

The disclosure relates to an airbag device and a method of fabricating the same and, more particularly, to an airbag device able to absorb an impact of an occupant and a method of fabricating the same.

2. Description of the Related Art

Purpose-built vehicles (PBVs) are smart vehicles into which LV4+ level autonomous driving technology is integrated. Each of PBVs can navigate itself to a destination without the driver having to manually operate the steering wheel, the accelerator, and the brake. PBVs have been rapidly developed in recent years.

In the case of a conventional passenger airbag (PAB) mounted in the interior of a vehicle, the airbag is supported by the windshield during inflation and deployment to absorb the impact of the occupant on the airbag.

However, respective PBVs have a wide gap between the instrument panel in which the airbag is mounted and the windshield due to the cabin structure, which means that the airbag is not supported by the windshield during inflation deployment. Thus, the airbag may be deformed rearward in the event of an occupant impact. This results in the airbag not being able to absorb the impact of the occupant safely. Therefore, there is a need for improvement.

The background technology of the disclosure is disclosed in Korean Patent No. 10-2027918 (registered on Sep. 26, 2019 and entitled "Vehicle Airbag Cushion and Folding Method Thereof").

SUMMARY

An objective of the disclosure intended to overcome the problems described above is to provide an airbag device able to safely absorb an impact of an occupant by preventing the cushion from being deformed rearward by the impact of the occupant and a method of fabricating the same.

Another objective of the disclosure is to provide an airbag device in which the cushion, when deployed, may be self-supported on the instrument panel to enhance the cushioning effect.

Another objective of the disclosure is to provide an airbag device able to limit the height of upward deployment of the cushion using an outer tether.

In a general aspect, an airbag device includes: a cushion mounted on an instrument panel and configured to inflate by injection of gas from an inflator and deploy upwardly between the instrument panel and an occupant; a partition provided in the cushion and configured to compartmentalize an interior of the cushion, the partition comprising a first opening through which gas flows upon deployment of the inflator; and a vent provided in the partition and configured to be in communication with the first opening to guide flow of gas.

The cushion may include: a first cushion portion configured to deploy toward a front of the occupant; and a second cushion portion configured to deploy at a rear of the first cushion portion to support the first cushion portion.

The airbag device may have the volume of the second cushion portion smaller than the volume of the first cushion portion.

Upon deployment of the airbag device, the internal pressure of the second cushion portion may be greater than the internal pressure of the first cushion portion.

The second cushion portion may be configured to deploy ahead of the first cushion portion.

The vent may include: a vent body extending from the partition toward the second cushion portion; and a second opening provided in an end of the vent body.

A diameter of the second opening may be smaller than a diameter of the first opening.

A diameter of the vent body may gradually decrease in a direction from the first opening to the second opening.

A center axis of the first opening and a center axis of the second opening may not coincide with each other.

In another general aspect, a method of fabricating an airbag device includes: folding a first cushion portion toward an inflator disposed in a housing; storing the folded first cushion portion in the housing; and folding a second cushion portion toward the first cushion portion such that the second cushion portion covers the first cushion portion.

In yet another general aspect, an airbag device includes: a housing mounted in an instrument panel; a cushion stored in the housing in a folded state and configured to inflate by injection of gas from an inflator and deploy upwards from the instrument panel; and an outer tether, wherein a first side of the outer tether is connected to the housing and a second side of the outer tether is connected to the cushion to limit upward deployment of the cushion.

The cushion may include: a first cushion portion configured to deploy toward a front of the occupant; and a second cushion portion connected to the first cushion portion and configured to deploy at a rear of the first cushion portion to support the first cushion portion.

The outer tether may include a first outer tether, wherein a first side of the first outer tether may be coupled to the housing by a first fastener, and wherein a second side of the first outer tether may be sewn to the first cushion portion.

The outer tether may include a second outer tether, wherein a first side of the second outer tether may be coupled to the housing by a second fastener, and wherein a second side of the second outer tether may be sewn to the first cushion portion at a position different from the first outer tether.

The first outer tether and the second outer tether may be coupled to the housing by the first and second fasteners in a stacked state.

The inflator may be mounted in the housing, wherein a portion of the housing to which the outer tether is coupled may be disposed opposite to a portion of the housing to which the inflator is coupled.

The volume of the second cushion portion may be smaller than the volume of the first cushion portion.

The second cushion portion may be configured to deploy ahead of the first cushion portion upon inflation of the cushion.

The outer tether may be configured to limit the upward deployment of the cushion such that the cushion does not contact a windshield of a vehicle at full deployment of the cushion.

The housing may include a slit, wherein the outer tether may extend from inside the housing through the slit and is coupled to an outer wall of the housing.

According to the disclosure, the second cushion portion is configured to be deployed ahead of the first cushion portion at the rear of the first cushion portion to which frontal impact is applied by the occupant. The second cushion portion also supports the first cushion portion by forming an internal pressure greater than the internal pressure of the first cushion portion. This configuration may prevent the cushion from being bent and deformed rearward when the occupant is pressed against the cushion, thereby safely absorbing the impact of the occupant.

The airbag device according to embodiments of the disclosure may prevent the cushion from deviating from the effective cushioning zone in which the cushion may effectively protect the occupant because the outer tether limits the upward deployment height of the cushion.

DETAILED DESCRIPTION

Figure 1:
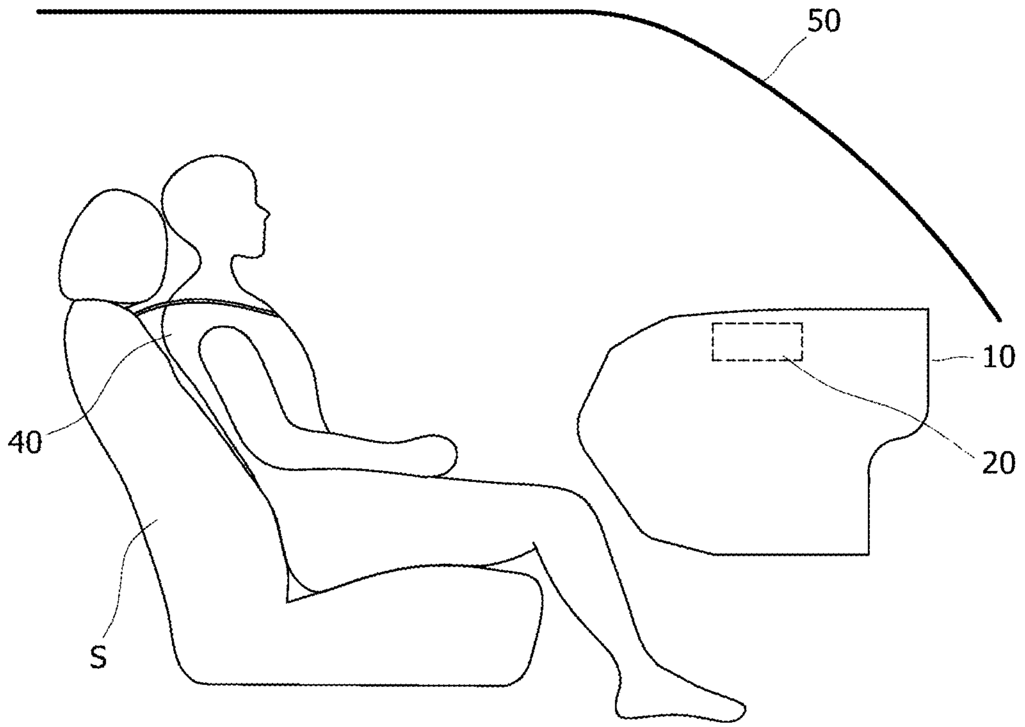
FIG. 1 is a view illustrating a state in which an airbag device according to embodiments of the disclosure is mounted in the instrument panel.

Hereinafter, embodiments of an airbag device according to the disclosure will be described with reference to the accompanying drawings. In this process, thicknesses of lines in the drawings and sizes of constituent elements may be exaggerated for clarity and convenience. Furthermore, the following terms are defined, in consideration of functions thereof in the disclosure, and may be varied according to the intention of a user or an operator and practices. Therefore, the terms should be defined on the basis of the contents of the entire specification.

Figure 2:
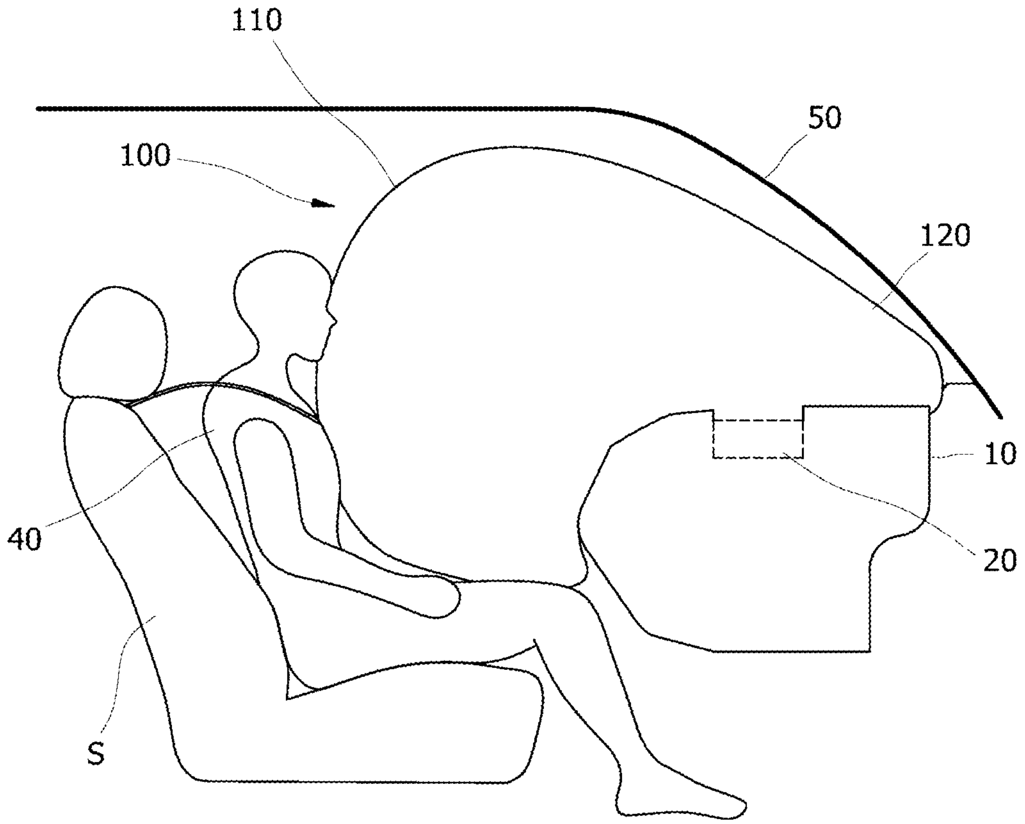
FIG. 2 is a view illustrating a state in which the airbag device according to embodiments of the disclosure is inflated and deployed.
Figure 3:
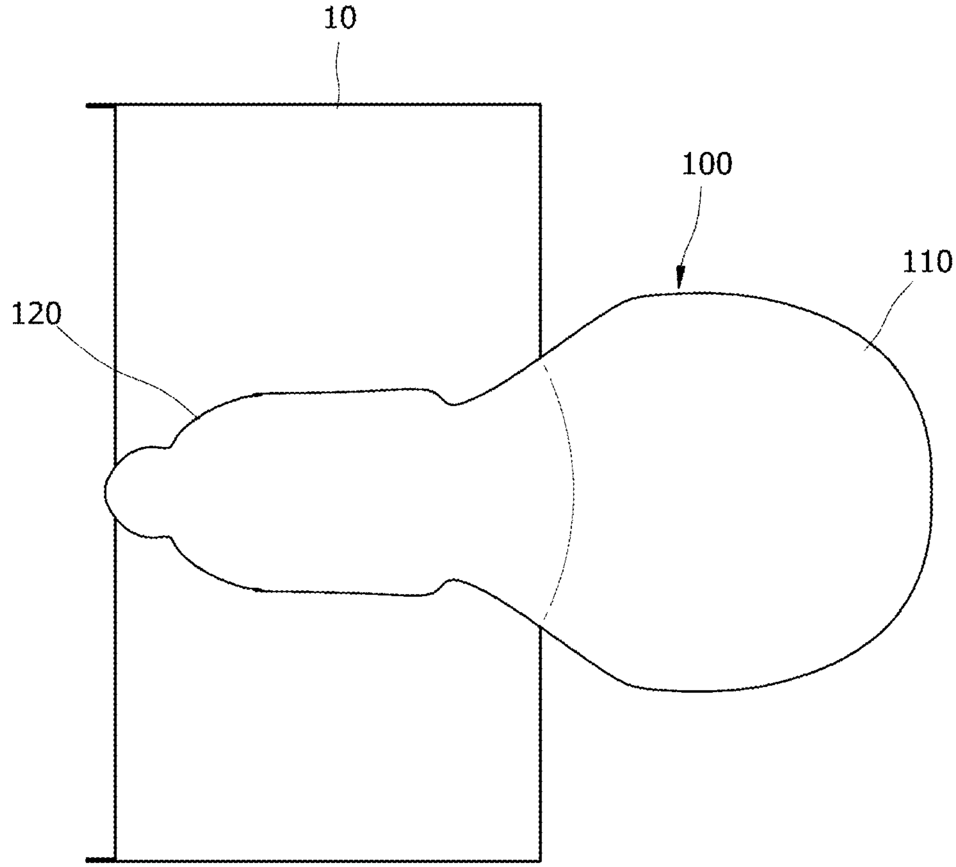
FIG. 3 is a top view of FIG. 2.
Figure 4:
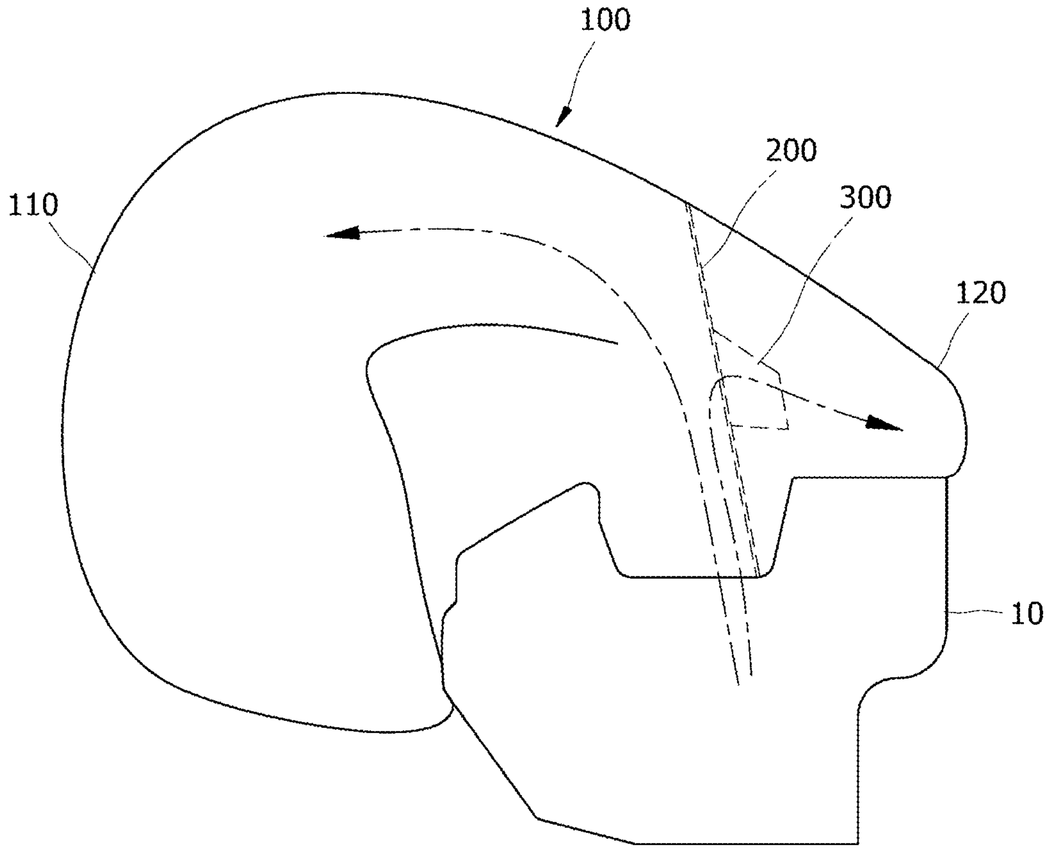
FIG. 4 is a side cross-sectional view schematically illustrating the interior of the cushion in the airbag device according to embodiments of the disclosure.
Figure 5:
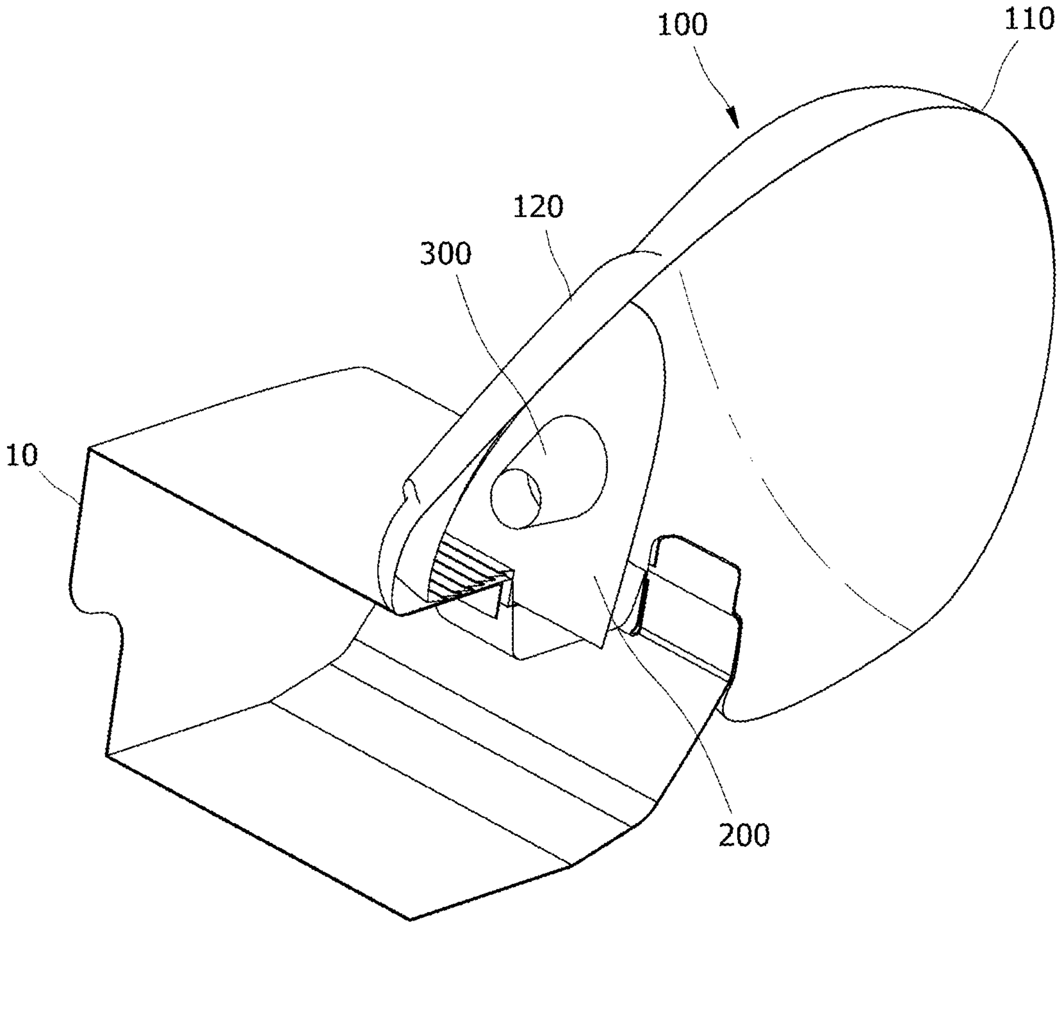
FIG. 5 is a perspective cross-sectional view schematically illustrating the interior of the cushion in the airbag device according to embodiments of the disclosure.
Figure 6:
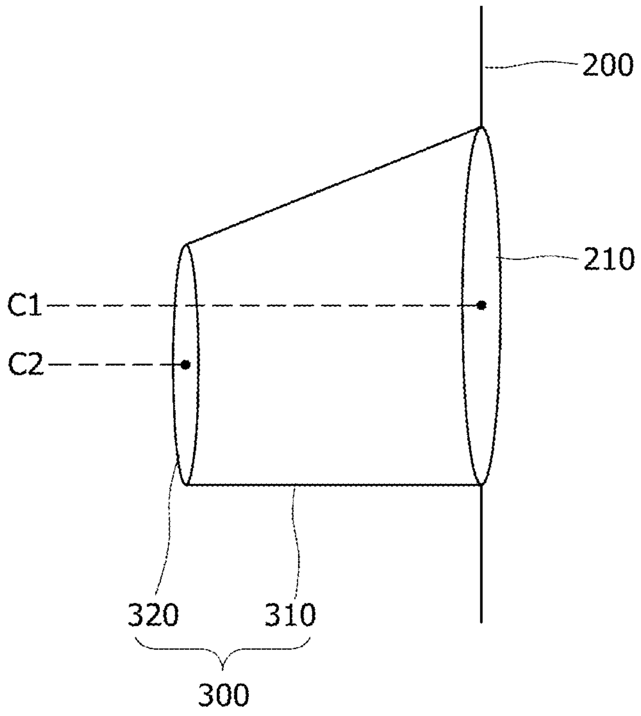
FIG. 6 is a side cross-sectional view schematically illustrating the vent in the airbag device according to embodiments of the disclosure.
Figure 7:
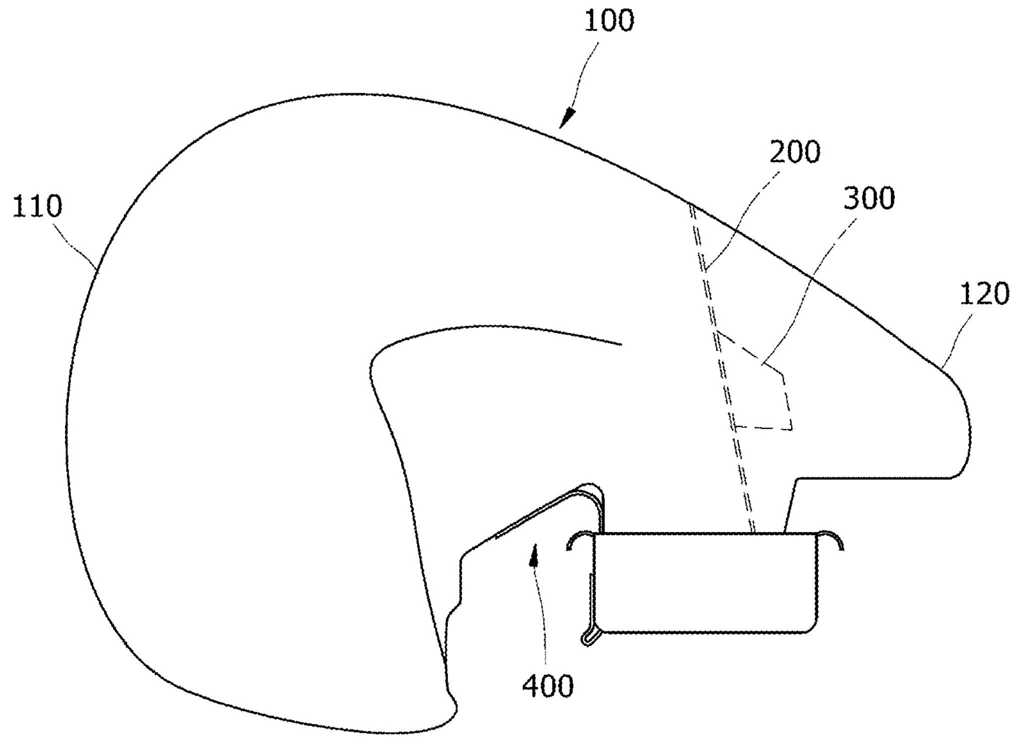
FIG. 7 is a side cross-sectional view schematically illustrating a state in which an outer tether is connected to the cushion in the airbag device according to embodiments of the disclosure.
Figure 8:
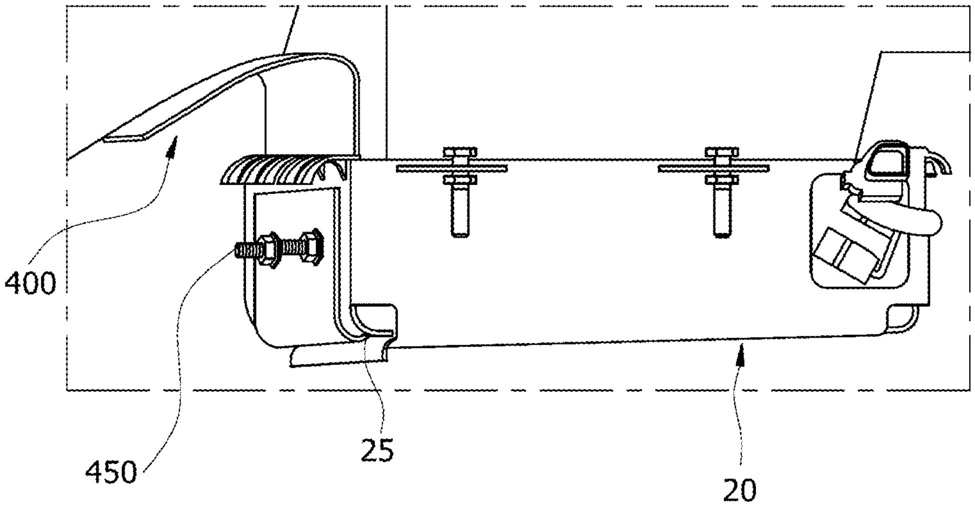
FIG. 8 is a side cross-sectional view schematically illustrating a state in which the outer tether is connected to the housing in the airbag device according to embodiments of the disclosure.
Figure 9:
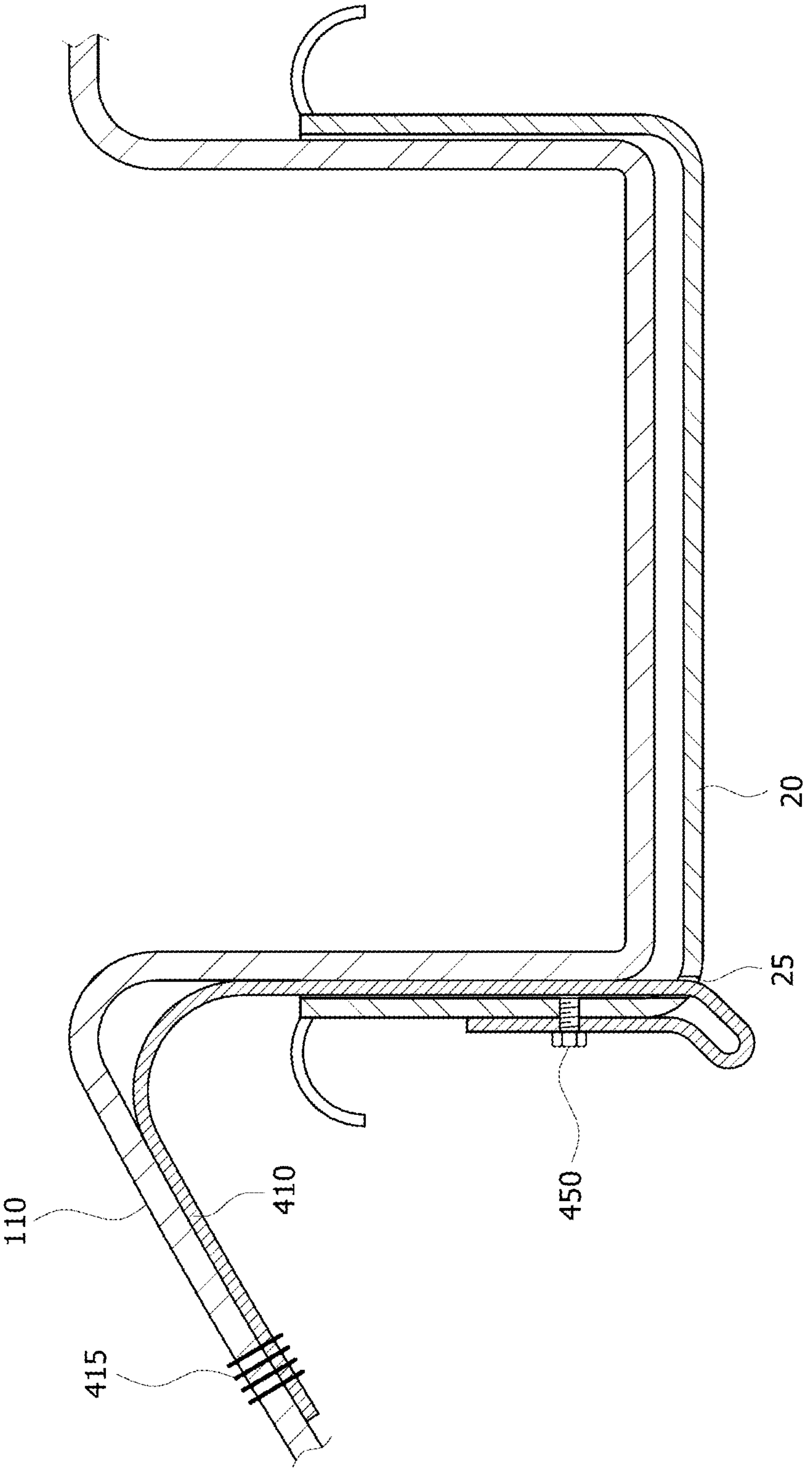
FIG. 9 is a side cross-sectional view illustrating a first embodiment of the outer tether in the airbag device according to embodiments of the disclosure.
Figure 10:
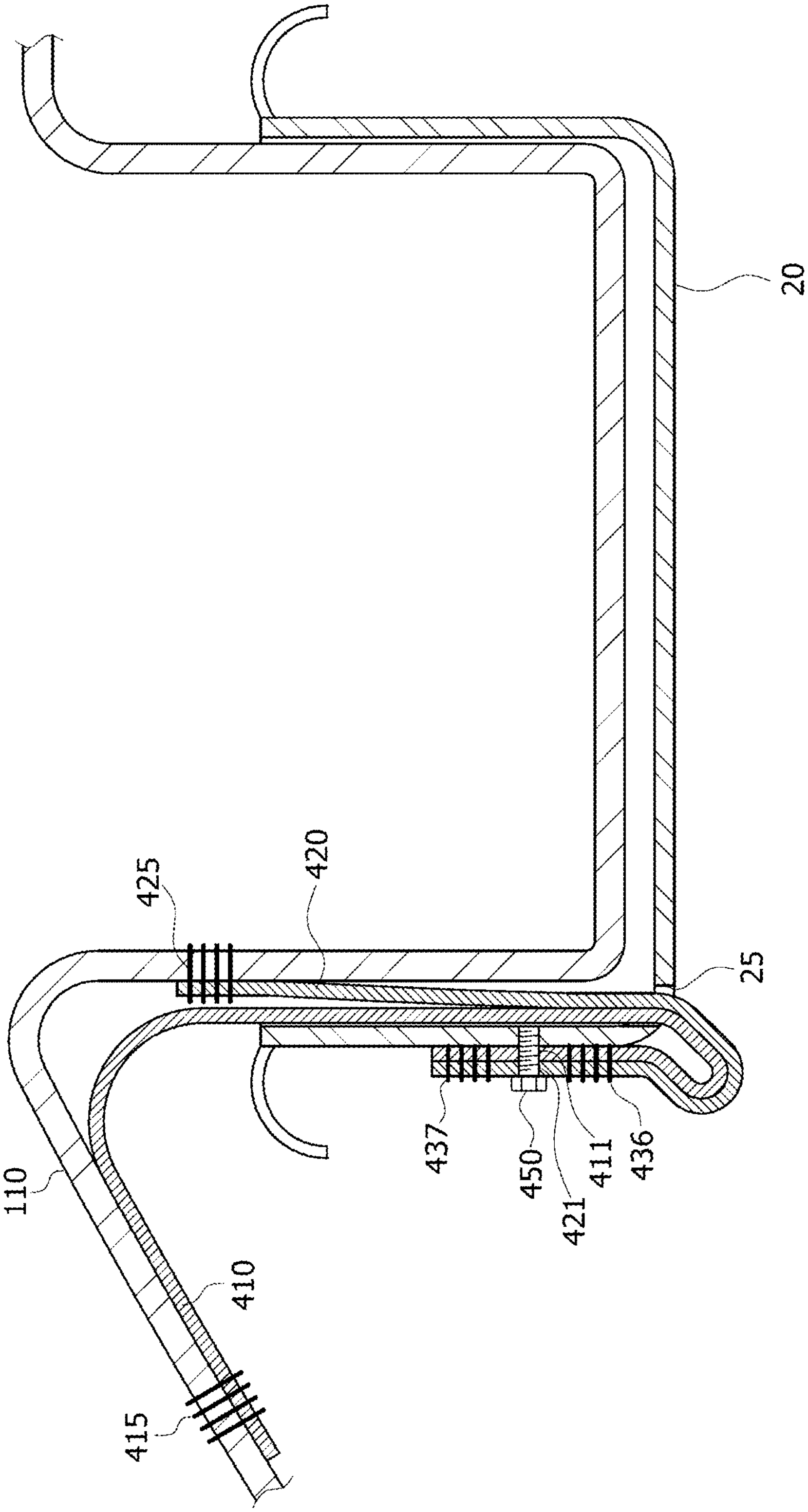
FIG. 10 is a side cross-sectional view illustrating a second embodiment of the outer tether in the airbag device according to embodiments of the disclosure.
Figure 11:
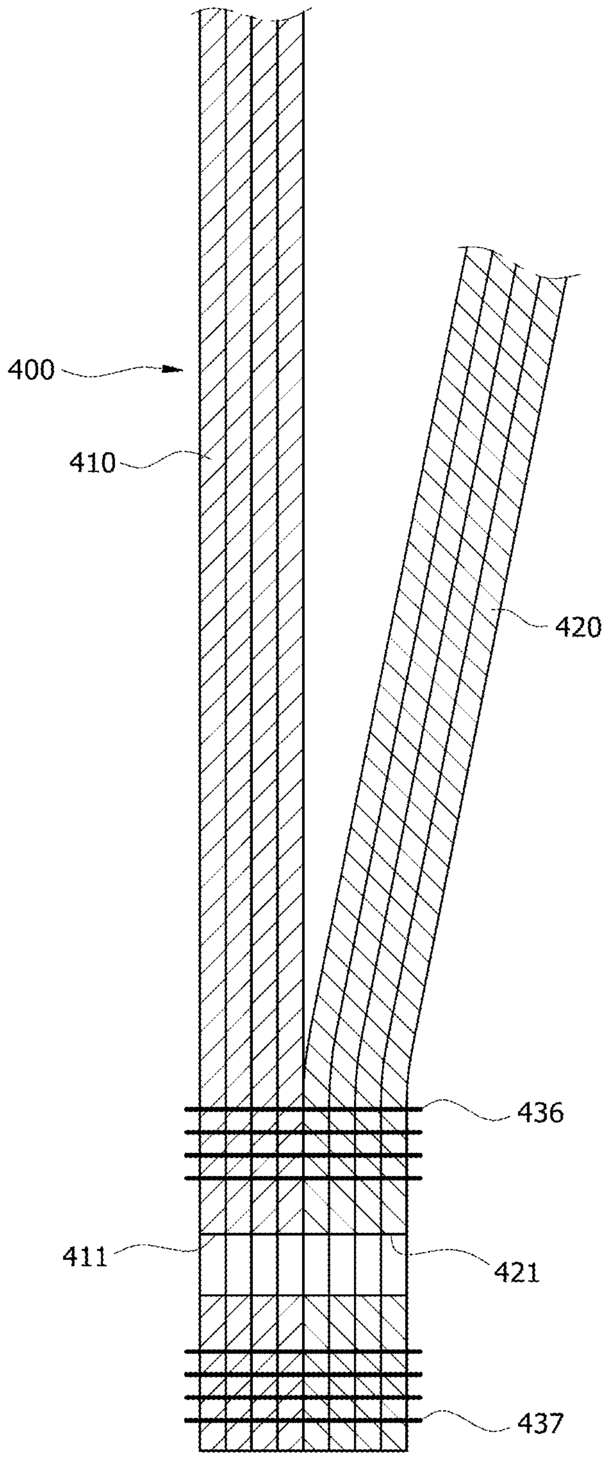
FIG. 11 is a view illustrating a connected state of a first outer tether and a second outer tether in the airbag device according to embodiments of the disclosure.
Figure 12:
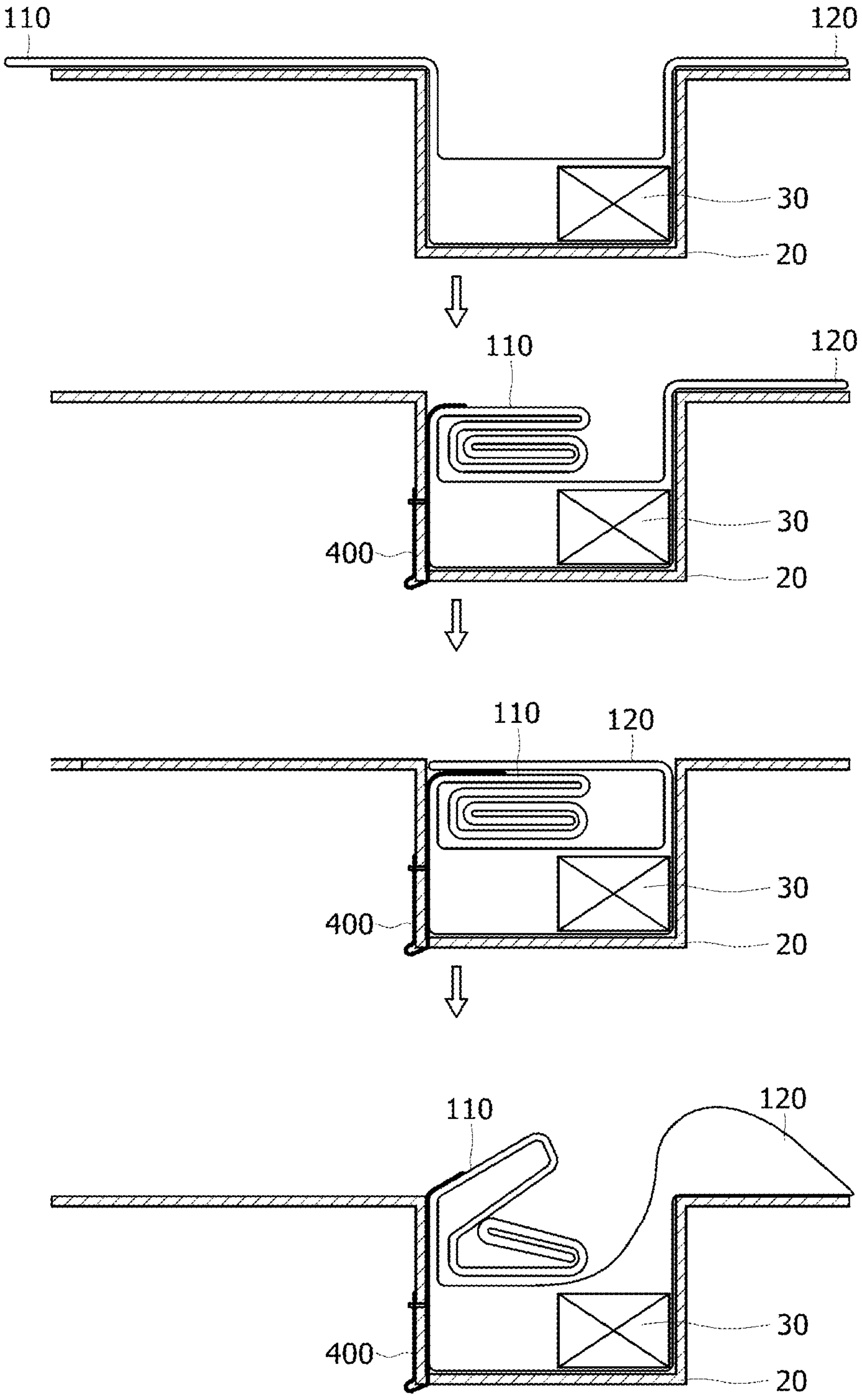
FIG. 12 is a view illustrating a sequence in which the airbag device according to embodiments of the disclosure is folded in and deployed from the housing.
Figure 13:
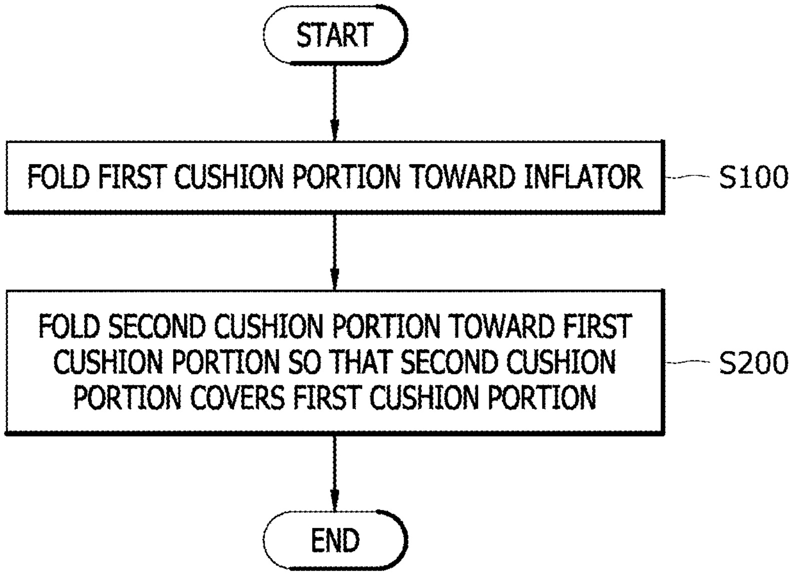
FIG. 13 is a flowchart schematically illustrating a method of fabricating an airbag device according to embodiments of the disclosure.

FIG. 1 is a view illustrating a state in which an airbag device according to embodiments of the disclosure is mounted in the instrument panel, FIG. 2 is a view illustrating a state in which the airbag device according to embodiments of the disclosure is inflated and deployed, FIG. 3 is a top view of FIG. 2, FIG. 4 is a side cross-sectional view schematically illustrating the interior of the cushion in the airbag device according to embodiments of the disclosure, FIG. 5 is a perspective cross-sectional view schematically illustrating the interior of the cushion in the airbag device according to embodiments of the disclosure, FIG. 6 is a side cross-sectional view schematically illustrating the vent in the airbag device according to embodiments of the disclosure, FIG. 7 is a side cross-sectional view schematically illustrating a state in which an outer tether is connected to the cushion in the airbag device according to embodiments of the disclosure, FIG. 8 is a side cross-sectional view schematically illustrating a state in which the outer tether is connected to the housing in the airbag device according to embodiments of the disclosure, FIG. 9 is a side cross-sectional view illustrating a first embodiment of the outer tether in the airbag device according to embodiments of the disclosure, FIG. 10 is a side cross-sectional view illustrating a second embodiment of the outer tether in the airbag device according to embodiments of the disclosure, FIG. 11 is a view illustrating a connected state of a first outer tether and a second outer tether in the airbag device according to embodiments of the disclosure, FIG. 12 is a view illustrating a sequence in which the airbag device according to embodiments of the disclosure is folded in and deployed from the housing, and FIG. 13 is a flowchart schematically illustrating a method of fabricating an airbag device according to embodiments of the disclosure.

Referring now to FIGS. 1 to 7, the airbag device according to embodiments of the disclosure is deployed from an instrument panel 10 disposed in the interior of a vehicle to protect an occupant in the event of an emergency situation, such as a crash of the vehicle.

The airbag device according to this embodiment includes a housing 20, a cushion 100, and an outer tether 400.

The housing 20 may be mounted in the instrument panel 10. The housing 20 may be disposed on an inner side of the instrument panel 10, and the cushion 100 may be stored in the housing 20 in a folded state.

The cushion 100 may be made of a fabric material, such as cloth. The cushion 100 may be inflated by the injection of gas generated by an inflator 30 and deployed outwards from the instrument panel 10.

The instrument panel 10 may be positioned in front of a seat S on which an occupant 40 is seated, and a windshield 50 may be positioned above the instrument panel 10.

The inflator 30 may be mounted in the instrument panel 10 to inject gas into the cushion 100. In this embodiment, the inflator 30 is disposed on the inner side of the housing 20 and, in the event of an emergency, such as a vehicle collision, may be controlled by a controller (not shown) to inject gas into the cushion 100 to inflate the cushion 100.

The cushion 100 may be deployed upwards from the instrument panel 10, and may be deployed between the instrument panel 10 and the occupant 40.

The airbag device according to this embodiment may further include a partition 200. The partition 200 inside the cushion 100 may compartmentalize the interior of the cushion 100.

The partition 200 may be formed of the same material as the cushion 100. The partition 200 may be sewn to the inner surface of the cushion 100 to compartmentalize the interior of the cushion 100 into a plurality of interior spaces.

The partition 200 may include a first opening 210 through which gas is injected into the cushion 100. The first opening 210 may be formed to extend through the partition 200 in the thickness direction. The shape of the first opening 210 may be circular or elliptical.

The cushion 100 may include a first cushion portion 110 and a second cushion portion 120. The cushion 100 may be separated into the first cushion portion 110 and the second cushion portion 120 by the partition 200.

The first cushion portion 110 may be integrally formed with the second cushion portion 120. The first cushion portion 110 may be provided with an internal space for containing gas. The interior of the first cushion portion 110 may communicate with the interior of the second cushion portion 120 through the first opening 210 formed in the partition 200.

The first cushion portion 110 may be inflated with gas injected by the inflator 30 to protrude from the housing 20 to the outside of the instrument panel 10 and be deployed between the instrument panel 10 and the occupant 40. The first cushion portion 110 may be deployed toward the front of the occupant 40 facing the instrument panel 10.

Thus, in an emergency situation such as a vehicle collision, the occupant 40 may collide with the first cushion portion 110 disposed in front of the occupant 40, thereby allowing the first cushion portion 110 to absorb the impact on the occupant 40.

The outer surface of the first cushion portion 110 deployed between the instrument panel 10 and the occupant 40 may contact the outer surface of the instrument panel 10 facing in the direction in which the occupant 40 is positioned. Thus, a portion of the first cushion portion 110 may be supported by the instrument panel 10.

The second cushion portion 120 may be deployed at the rear of the first cushion portion 110 to support the first cushion portion 110. Here, the rear of the first cushion portion 110 may refer to a direction opposite to the direction of deployment of the first cushion portion 110, which is deployed in the direction in which the occupant 40 is positioned.

The second cushion portion 120 may have an internal space for containing gas. The second cushion portion 120 may be inflated with gas injected by the inflator 30 and deployed upwards from the instrument panel 10 and toward the windshield 50.

The second cushion portion 120 may be deployed upwards from the instrument panel 10. At this time, the inflator 30 may be disposed adjacent to the second cushion portion 120.

The second cushion portion 120 may have a shape that gradually decreases in width and height from the partition 200 toward one end. The second cushion portion 120 may have a shape that gradually decreases in width and height from the partition 200 located at the front of the second cushion portion 120 toward the rear of the second cushion portion 120. For example, the shape of the second cushion portion 120 may resemble a bird's beak.

The volume of the second cushion portion 120 may be smaller than the volume of the first cushion portion 110. The second cushion portion 120 may be deployed ahead of the first cushion portion 110. Even in the case that the first cushion portion 110 and the second cushion portion 120 are inflated together by the gas injection by the inflator 30, the second cushion portion 120, which has a smaller volume than the first cushion portion 110, may complete the deployment before the first cushion portion 110.

In this manner, the second cushion portion 120 is deployed first so that the first cushion portion 110 is deployed in a state in which the second cushion portion 120 is first supported on the surface of the instrument panel 10. This may reduce the amount that the cushion 100 is pushed toward the windshield 50 during deployment of the first cushion portion 110.

The second cushion portion 120 may be deployed at the rear of the first cushion portion 110 to support the first cushion portion 110.

A vent 300 may be provided in partition 200. The vent 300 may be integrally provided with the partition 200. The vent 300 may include the same material as the partition 200.

The vent 300 may be sewn into the partition 200. The vent 300 may be provided on an outer side of the partition 200 facing in the direction in which the second cushion portion 120 is located.

The vent 300 may communicate with the first opening 210 provided in the partition 200. The vent 300 may have a hollow shape to allow gas to flow. The vent 300 may include a vent body 310 and a second opening 320.

The vent body 310 may be hollow, with a hollow interior. The vent body 310 may extend from the partition 200 toward the second cushion portion 120. The vent body 310 may extend a set length from an outer first side of the partition 200 to an inner side of the second cushion portion 120. One end of the vent body 310 may be connected to the first opening 210 provided in the partition 200.

The second opening 320 may be provided in one end of the vent body 310. The second opening 320 may be provided in one end of the vent body 310 facing the inside of the second cushion portion 120. The shape of the second opening 320 may be circular or elliptical.

The diameter of the second opening 320 provided in the vent body 310 may be smaller than the diameter of the first opening 210 provided in the partition 200, and the diameter of the vent body 310 may gradually decrease in the direction from the first opening 210 to the second opening 320. In other words, the vent body 310 may have a funnel shape.

Because the diameter of the second opening 320 is smaller than the diameter of the first opening 210 and the diameter of the vent body 310 decreases in the direction from the first opening 210 to the second opening 320, gas generated by the inflator 30 and injected into the first cushion portion 110 may smoothly flow sequentially through the first opening 210, the vent body 310, and the second opening 320 into the second cushion portion 120.

In contrast, flow of the gas from inside the second cushion portion 120 toward the first cushion portion 110 is reduced. Therefore, the internal pressure of the second cushion portion 120 may be maintained at a greater pressure per unit area than the internal pressure of the first cushion portion 110. The directions of the gas flows are indicated by arrows in FIG. 4.

Because the internal pressure of the second cushion portion 120 is formed to be greater than the internal pressure of the first cushion portion 110, even in the case that the occupant 40 collides with the first cushion portion 110 and pressure is applied toward the rear of the first cushion portion 110 (in the right direction in FIG. 2), the second cushion portion 120 deployed at the rear of the first cushion portion 110 firmly supports the first cushion portion 110. As a result, the first cushion portion 110 may absorb the impact to the occupant 40 without being significantly deformed.

The center axis C1 of the first opening 210 provided in the partition 200 and the center axis C2 of the second opening 320 provided in the vent body 310 may not coincide with each other. The center axis C1 of the first opening 210 and the center axis C2 of the second opening 320 may be set side by side.

One edge of the vent body 310 has the shape of a straight line, and the other edge has the shape of an inclined line, such that the inclined line is longer than the straight line.

Because the internal pressure of the second cushion portion 120 is formed to be greater than the internal pressure of the first cushion portion 110, a strong fluid pressure of gas pushes gas from the second cushion portion 120 into the first cushion portion 110 through the first opening 210 provided in the partition 200.

When the gas pressure is applied to the first cushion portion 110, the straight edge of the vent body 310 may be bent by the gas pressure, thereby deforming the vent body 310 into a folded shape. As the vent body 310 is deformed into a folded shape by the fluid pressure of the gas toward the first cushion portion 110, the internal flow path of the vent body 310 may be closed. As a result, the second cushion portion 120 may maintain a greater internal pressure than the first cushion portion 110.

Referring to FIGS. 1, 2, and 7 to 13, to limit upward deployment of the cushion 100, a first side of the outer tether 400 may be connected to the housing 20 and a second side of the outer tether 400 may be connected to the cushion 100.

The outer tether 400 may be formed of a fabric material, such as cloth, and may be a cotton tether. The outer tether 400 may be coupled to the housing 20 by a fastener 450, such as a screw or a bolt and nut, and may be sewn to the cushion 100.

Because the first side of the outer tether 400 is coupled to the housing 20 fixedly disposed on the instrument panel 10, the upward deployment height of the cushion 100 may be limited by the length of the outer tether 400 when the cushion 100 is deployed. The length of the outer tether 400 may be set such that, when the cushion 100 is fully deployed, the sewn portions of the outer tether 400 and the cushion 100 are positioned below the chest level of the occupant 40.

The outer tether 400 may include a first outer tether 410. A first side of the first outer tether 410 may be coupled to the housing 20 by the fastener 450, and a second side of the first outer tether 410 may be sewn to the first cushion portion 110. Reference numeral 415 indicates the sewn portions of the first cushion portion 110 and the first outer tether 410.

The housing 20 may be provided with a slit 25. The slit 25 may be a rectangular hole formed in the bottom surface of the housing 20 in the width direction of the housing 20.

The first side of the first outer tether 410 may be sewn to the first cushion portion 110, and the remaining portion of the first outer tether 410 may be coupled to the outer wall of the housing 20 by extending through the slit 25 from the inner side of the housing 20. At this time, because the fastener 450 is disposed on the outer portion of the housing 20, the cushion 100 may be prevented from being damaged by the fastener 450 during the deployment of the cushion 100. In another example, the first outer tether 410 may be coupled to the housing 20 at the inner wall of the housing 20.

Because the first outer tether 410 is disposed through the slit 25 in the bottom of the housing 20, force applied to the first outer tether 410 upon inflation of the cushion 100 is distributed around the fastener 450 and the slit 25 of the housing 20.

Accordingly, the first outer tether 410 may limit the upward inflation height of the cushion 100 more reliably than when the first outer tether 410 is coupled to the housing 20 only with the fastener 450. Furthermore, because the first outer tether 410 is coupled to the housing 20 by extending through the slit 25 at a side opposite to the direction (i.e., upward direction) in which the first outer tether 410 moves during deployment of the cushion 100, the first outer tether 410 may reliably limit the upward inflation height of the cushion 100 while remaining fixed to the housing 20.

The outer tether 400 may include a second outer tether 420 in addition to the first outer tether 410. A first side of the second outer tether 420 may be coupled to the housing 20 by a fastener 450, and the second side of the second outer tether 420 may be sewn to the first cushion portion 110 at a different point from the first outer tether 410. Reference numeral 425 indicates sewn portions of the first cushion portion 110 and the second outer tether 420.

The first outer tether 410 may be sewn to a point of the first cushion portion 110 that is disposed on an outer portion of the housing 20 when the first cushion portion 110 is fully deployed, and the second outer tether 420 may be sewn to a point of the first cushion portion 110 that is disposed on an inner portion of the housing 20 when the first cushion portion 110 is fully deployed.

The first side of the second outer tether 420 may be sewn to the first cushion portion 110, and the remaining portion of the second outer tether 420 may be coupled to the outer wall of the housing 20 by extending through the slit 25 from the inner side of the housing 20. At this time, because the fastener 450 is disposed on the outer portion of the housing 20, the cushion 100 may be prevented from being damaged by the fastener 450 during deployment of the cushion 100. In another example, the second outer tether 420 may be coupled to the housing 20 at an inner wall of the housing 20.

Because the second outer tether 420 is disposed through the slit 25 in the bottom of the housing 20, force applied to the second outer tether 420 during inflation of the cushion 100 is distributed around the fastener 450 and the slit 25 of the housing 20.

Accordingly, the second outer tether 420 may limit the upward inflation height of the cushion 100 more reliably than when the second outer tether 420 is coupled to the housing 20 only with the fastener 450. Furthermore, because the second outer tether 420 is coupled to the housing 20 through the slit 25 at a side opposite to the direction in which the second outer tether 420 moves (upwards) during deployment of the cushion 100, the second outer tether 420 may reliably limit the upward inflation height of the cushion 100 while remaining fixed to the housing 20.

The first outer tether 410 and the second outer tether 420 may be integrated together by sewing. In this embodiment, the first outer tether 410 and the second outer tether 420 may be sewn at a plurality of points. The first outer tether 410 and the second outer tether 420 may be connected by first connecting sewn portions 436, and may be connected by second connecting sewn portions 437 at a point spaced a selected distance from the first connecting sewn portions 436. Between the first connecting sewn portions 436 and the second connecting sewn portions 437, a first fastening hole 411 and a second fastening hole 421 through which the fastener 450 extends may be provided.

The first outer tether 410 and the second outer tether 420 may extend through the slit 25 in a stacked state and be joined together to the outer wall of the housing 20 by the fastener 450.

The portion of the housing 20 to which the outer tether 400 is coupled may be opposite to the portion of the housing 20 to which the inflator 30 is coupled. The inflator 30 may be disposed adjacent to the second cushion portion 120 to provide gas to the second cushion portion 120 first. The outer tether 400 may be disposed adjacent to the first cushion portion 110 which absorbs the impact of the occupant 40 to limit the upward deployment height of the first cushion portion 110.

The outer tether 400 may limit the upward deployment of the cushion 100 such that the cushion 100 does not contact the windshield 50 of the vehicle when fully inflated, i.e., when at full deployment.

According to this embodiment, because the outer tether 400 limits the upward deployment height of the first cushion portion 110 in a state in which the second cushion portion 120 is supported on the surface of the instrument panel 10, the cushion 100 does not contact the windshield 50 and may therefore reliably absorb the impact on the occupant 40 even when not supported by the windshield 50.

As the cushion 100 approaches full inflation, tension may be applied between the first side of the outer tether 400 connected to the cushion 100 and the second side of the outer tether 400 coupled to the housing 20. Accordingly, the outer tether 400, which is somewhat loose at the portion coupled to the housing 20 as shown in FIGS. 9 and 10, may be tensioned and be in tight contact with the outer wall of the housing 20 as shown in FIG. 8.

Referring to FIGS. 12 and 13, a method of fabricating an airbag device according to embodiments of the disclosure includes folding the first cushion portion 110 toward the inflator 30 disposed in the housing 20 and storing the folded first cushion portion 110 in the housing 20 (S100). The housing 20 may be the instrument panel 10 of a vehicle. In another embodiment, the housing 20 may be mounted in the interior of the instrument panel 10.

Of the first cushion portion 110 and the second cushion portion 120 that extend in opposite directions about the housing 20, the first cushion portion 110 is rolled and folded toward the housing 20 and positioned in the housing 20. The inflator 30 may be disposed adjacent to the second cushion portion 120 in the housing 20.

Thereafter, the second cushion portion 120 is folded toward the first cushion portion 110 so that the second cushion portion 120 covers the first cushion portion 110 (S200). The second cushion portion 120 is folded toward the inflator 30 and the first cushion portion 110, which is folded and stored in the housing 20, to cover the inflator 30 and the first cushion portion 110, thereby covering the opening of the housing 20.

When the first cushion portion 110 and the second cushion portion 120 are inflated together with gas injected by the inflator 30, the second cushion portion 120 may be deployed ahead of the first cushion portion 110 in response to the injection of gas by the inflator 30 disposed adjacent to the second cushion portion 120. The second cushion portion 120 may be deployed ahead of the first cushion portion 110 while being pushed by the pressurization of the first cushion portion 110, which is inflated by the injection of gas by the inflator 30.

In the airbag device and the method of fabricating the same according to embodiments of the disclosure, the second cushion portion 120 is configured to be deployed ahead of the first cushion portion 110 at the rear of first cushion portion 110 to which frontal impact is applied by the occupant 40. The second cushion portion 120 also supports the first cushion portion 110 by forming an internal pressure greater than the internal pressure of the first cushion portion 110. This configuration may prevent the cushion 100 from being bent and deformed rearward when the occupant 40 is pressed against the cushion 100, thereby safely absorbing the impact of the occupant 40.

The airbag device according to embodiments of the disclosure may prevent the cushion 100 from deviating from the effective cushioning zone in which the cushion 100 may effectively protect the occupant 40 because the outer tether 400 limits the upward deployment height of the cushion 100. In other words, this embodiment may prevent the upward deployment force of the cushion 100 from causing the cushion 100 to move out of the effective cushioning zone, which may result in insufficient protection to the occupant 40 in the event of an accident. Accordingly, the airbag device according to embodiments may be applied to various types of vehicles including purpose-built vehicles.

Although the disclosure has been disclosed with respect to the embodiments shown in the drawings, it is for illustrative purposes only, and a person having ordinary skill in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An airbag device comprising:
- a cushion mounted on an instrument panel and configured to inflate by injection of gas from an inflator and deploy upwardly between the instrument panel and an occupant;
- a partition provided in the cushion and configured to compartmentalize an interior of the cushion, the partition comprising a first opening through which gas flows upon deployment of the inflator; and
- a vent provided in the partition and configured to be in communication with the first opening to guide flow of gas,
- wherein the vent includes a vent body, wherein one edge of the vent body has a shape of a straight line and another edge of the vent body has a shape of an inclined line such that the inclined line is longer than the straight line, and wherein, when gas pressure is applied so as to push gas from inside a second cushion portion toward a first cushion portion through the first opening, the straight edge of the vent body is bent by the gas pressure to deform the vent body into a folded shape such that an internal flow path of the vent body is closed to obstruct or reduce flow of gas from inside the second cushion portion toward the first cushion portion, wherein:
- the first cushion portion is configured to deploy toward a front of the occupant; and
- the second cushion portion is configured to deploy at a rear of the first cushion portion to support the first cushion portion.

2. The airbag device of claim 1, wherein the volume of the second cushion portion is smaller than the volume of the first cushion portion.

3. The airbag device of claim 1, wherein, upon deployment of the airbag device, the internal pressure of the second cushion portion is greater than the internal pressure of the first cushion portion.

4. The airbag device of claim 1, wherein the second cushion portion is configured to deploy earlier than the first cushion portion.

5. The airbag device of claim 1, wherein:

the vent body extends from the partition toward the second cushion portion, and wherein the vent includes a second opening provided in an end of the vent body.

6. The airbag device of claim 5, wherein a diameter of the second opening is smaller than a diameter of the first opening.

7. The airbag device of claim 5, wherein a diameter of the vent body gradually decreases in a direction from the first opening to the second opening.

8. The airbag device of claim 5, wherein a center axis of the first opening and a center axis of the second opening do not coincide with each other.

* * * * *